United States Patent
Tajima et al.

(10) Patent No.: US 8,170,029 B2
(45) Date of Patent: May 1, 2012

(54) INTERMITTENT COMMUNICATION SYSTEM, BASE STATION APPARATUS AND MOBILE STATION APPARATUS

(75) Inventors: Yoshiharu Tajima, Kawasaki (JP);
Kazuhisa Obuchi, Kawasaki (JP);
Yoshinori Tanaka, Kawasaki (JP);
Yoshihiro Kawasaki, Kawasaki (JP);
Yoshiaki Ohta, Kawasaki (JP);
Katsumasa Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 428 days.

(21) Appl. No.: 12/493,817

(22) Filed: Jun. 29, 2009

(65) Prior Publication Data

US 2009/0264132 A1 Oct. 22, 2009

Related U.S. Application Data

(63) Continuation of application No. PCT/JP2007/050878, filed on Jan. 22, 2007.

(51) Int. Cl.
*H04L 12/28* (2006.01)
*H04W 4/00* (2009.01)
*H04W 36/00* (2009.01)

(52) U.S. Cl. ............... 370/395.2; 370/331; 455/436

(58) Field of Classification Search ............ 370/252, 370/310, 310.2, 328, 331, 338, 395.2, 503, 370/527, 529; 455/436–438
See application file for complete search history.

(56) References Cited

U.S. PATENT DOCUMENTS

| | | | |
|---|---|---|---|
| 6,556,834 B1 | 4/2003 | Kobayashi et al. | |
| 7,110,377 B2 * | 9/2006 | Hsu et al. | 370/331 |
| 7,174,166 B2 * | 2/2007 | Song et al. | 455/436 |
| 7,200,126 B2 * | 4/2007 | Lim | 370/331 |
| 7,327,704 B2 * | 2/2008 | Sayeedi | 370/329 |
| 7,483,885 B2 * | 1/2009 | Chandrasekar et al. | 1/1 |
| 7,519,015 B2 * | 4/2009 | Bae et al. | 370/311 |
| 7,818,006 B2 * | 10/2010 | Kim et al. | 455/436 |
| 8,026,464 B2 * | 9/2011 | Romeo et al. | 219/730 |
| 8,036,709 B2 * | 10/2011 | Kim et al. | 455/561 |
| 8,054,801 B2 * | 11/2011 | Gao et al. | 370/331 |
| 2002/0006805 A1 | 1/2002 | New et al. | |
| 2002/0041576 A1 * | 4/2002 | Chang et al. | 370/331 |
| 2002/0082017 A1 | 6/2002 | Hattori | |

(Continued)

FOREIGN PATENT DOCUMENTS

JP 06-216833 8/1994

(Continued)

OTHER PUBLICATIONS

Korean Intellectual Property Office, "Notice of Preliminary Rejection" issued for corresponding Korean Patent Application No. 10-2011-7006516, mailed Mar. 31, 2011. Full English translation attached.

(Continued)

*Primary Examiner* — Warner Wong
(74) *Attorney, Agent, or Firm* — Myers Wolin, LLC

(57) ABSTRACT

In an intermittent communication system where an intermittent communication can be made between a base station and a mobile station, a transmitting unit of the mobile station transmits a request to start a normal communication after stopping an intermittent communication at timing different from the intermittent communication if a handover is determined to be required. A transiting unit transits from the intermittent communication to the normal communication after the transmitting unit transmits the request. A handover performing unit performs a handover upon completion of transition to the normal communication by the transiting unit.

10 Claims, 18 Drawing Sheets

U.S. PATENT DOCUMENTS

| | | | |
|---|---|---|---|
| 2003/0103479 A1* | 6/2003 | Anderson et al. | 370/335 |
| 2003/0117968 A1 | 6/2003 | Motegi et al. | |
| 2004/0043798 A1 | 3/2004 | Amerga et al. | |
| 2004/0062227 A1* | 4/2004 | Sayeedi | 370/350 |
| 2004/0121771 A1* | 6/2004 | Song et al. | 455/436 |
| 2005/0059437 A1 | 3/2005 | Son et al. | |
| 2005/0094601 A1* | 5/2005 | Hsu et al. | 370/331 |
| 2005/0221827 A1 | 10/2005 | Natsume | |
| 2005/0237977 A1* | 10/2005 | Sayeedi | 370/331 |
| 2005/0265277 A1* | 12/2005 | Thadasina et al. | 370/328 |
| 2006/0109820 A1 | 5/2006 | Miyata | |
| 2006/0116136 A1 | 6/2006 | Noma | |
| 2007/0053315 A1* | 3/2007 | Sugaya | 370/318 |
| 2007/0140178 A1* | 6/2007 | Jung et al. | 370/335 |
| 2007/0211654 A1* | 9/2007 | Kim et al. | 370/318 |
| 2008/0013489 A1* | 1/2008 | Anigstein et al. | 370/331 |
| 2008/0144573 A1* | 6/2008 | Sairanen | 370/331 |
| 2008/0144574 A1* | 6/2008 | Jayapalan et al. | 370/331 |

FOREIGN PATENT DOCUMENTS

| | | |
|---|---|---|
| JP | 2000-069523 | 3/2000 |
| JP | 2000-224646 | 8/2000 |
| JP | 2002-199428 | 7/2002 |
| JP | 2003-179539 | 6/2003 |
| JP | 2004-504783 | 2/2004 |
| JP | 2004-194015 | 7/2004 |
| JP | 2005-286807 | 10/2005 |
| JP | 2006-148836 | 6/2006 |

OTHER PUBLICATIONS

Korean Intellectual Property Office, "Notice of Preliminary Rejection" issued for corresponding Korean Patent Application No. 10-2011-7006517, mailed Mar. 31, 2011. Full English translation attached.

International Search Report on Patentability and Written Opinion of PCT/JP2007/050878, dated Feb. 2, 2007.

3GPP TR 25.913 V7.2.0 (Dec. 2005); "3rd Generation Partnership Project; Technical Specification Group Radio Access Network; Requirements for Evolved UTRA (E-UTRA) and Evolved UTRAN (E-UTRAN)"; (Release 7); Dec. 2005.

3GPP TR 25.814 V7.0.0 (Jun. 2006); "3rd Generation Partnership Project; Technical Specification Group Radio Access Network; Physical layer aspects for evolved Universal Terrestrial Radio Access (UTRA)"; (Release 7); Jun. 2006.

Extended European Search Report issued for corresponding European Patent Application No. 07707141.3, dated Sep. 20, 2011.

The Intellectual Property Office of Canada "Official Communication" issued for corresponding Canadian Patent Application No. 2,674,748, dated Sep. 13, 2011.

LG Electronics; "DRX Scheme" Agenda Item: 5.2.7; Document for: Discussion and Decision; XP-002450413; R2-070265; 3GPP TSG-RAN WG2 #56bis, Jan. 15-19, 2007, Sorrento, Italy.

Panasonic (EMAIL RAPPORTEUR); "Summary of email discussion on DRX in LTE_ACTIVE"; Agenda Item: 5.2.7; Document for: Discussion; XP-002450415; R2-070088; 3GPP TSG RAN WG2 # 56bis, Jan. 15-19, Sorrento, Italy.

* cited by examiner

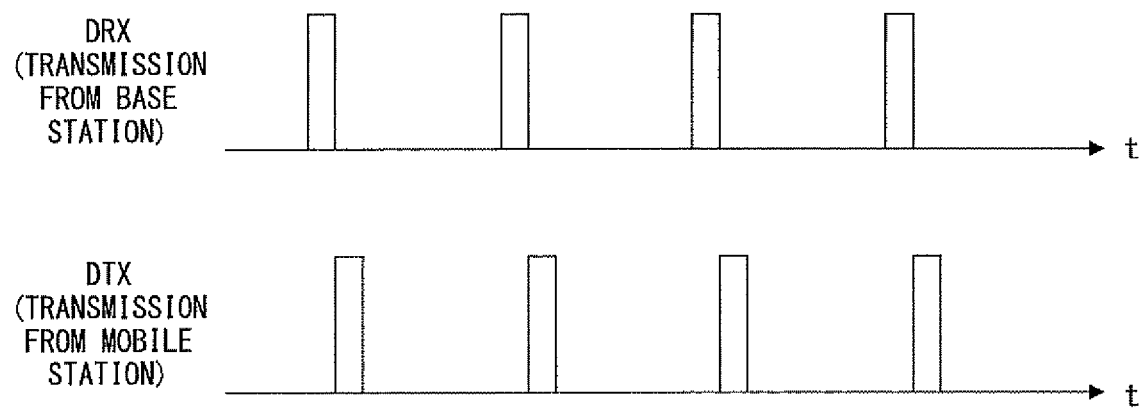
F I G. 1

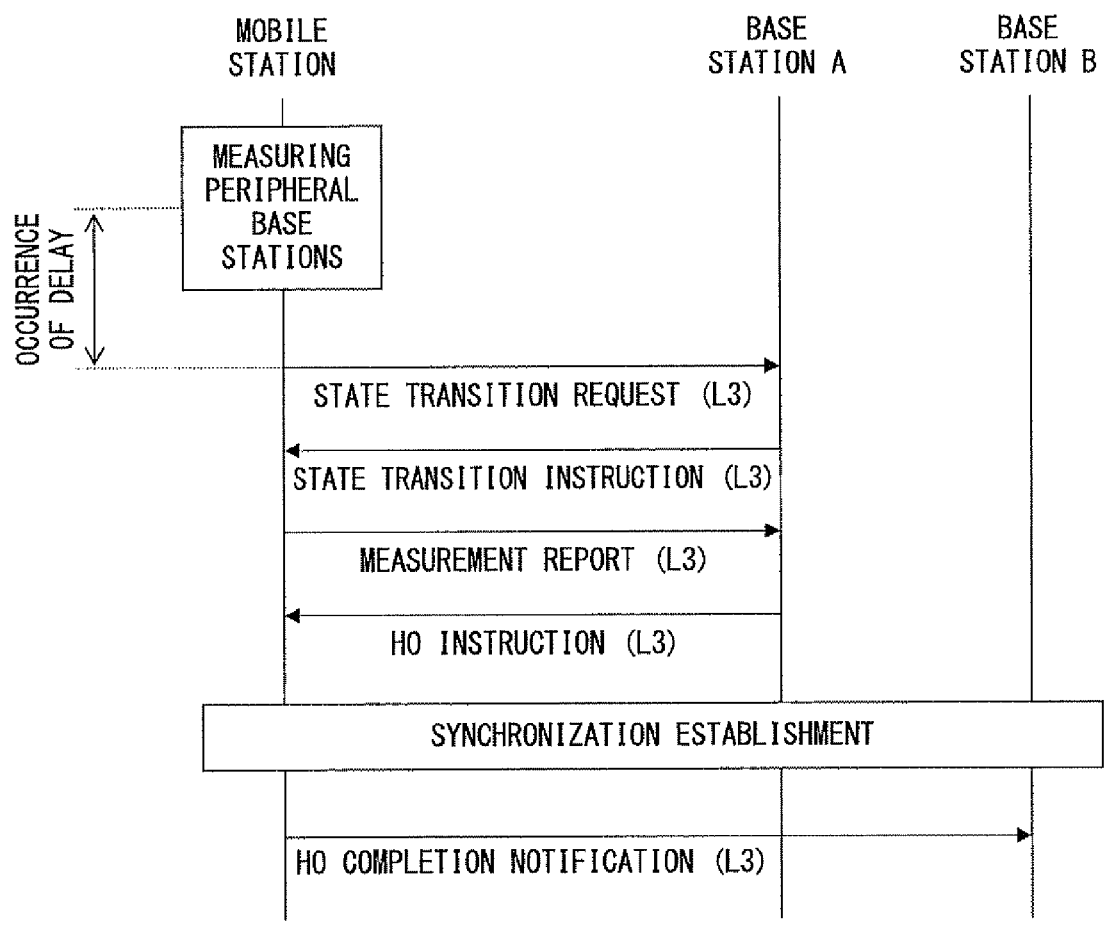
F I G. 3

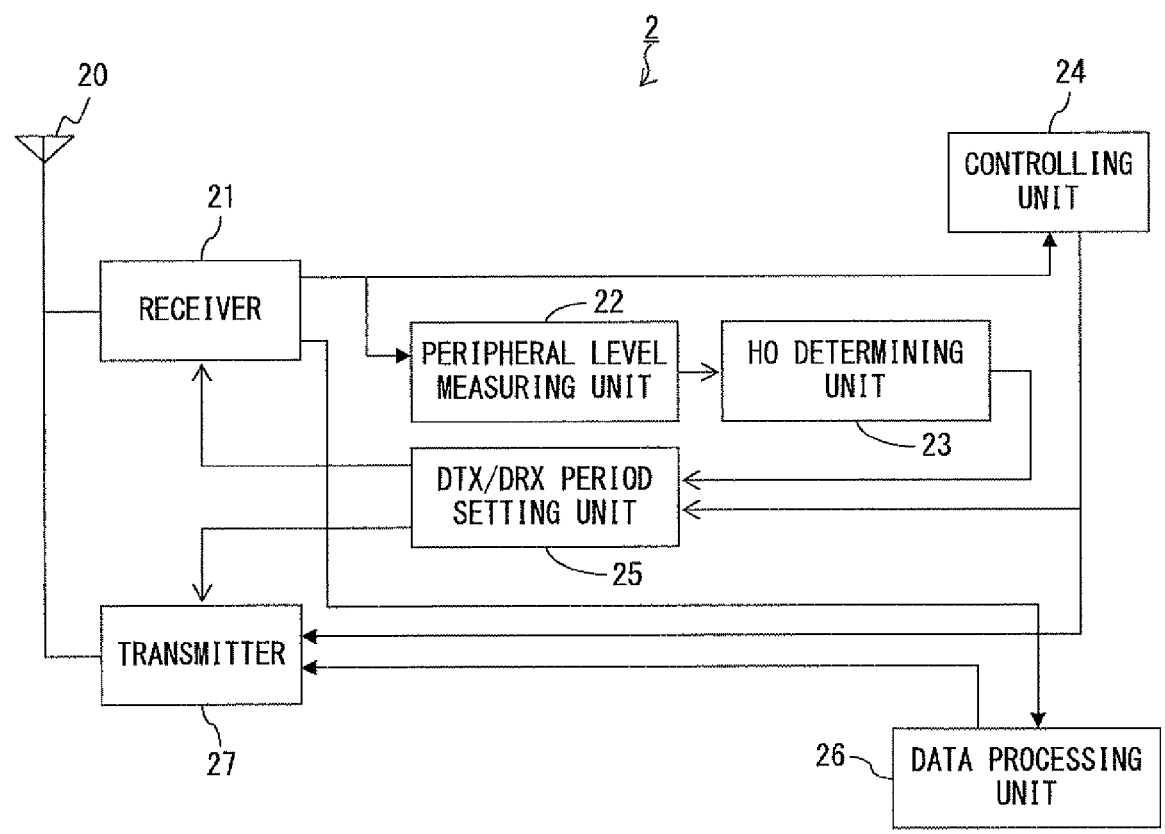
F I G. 4

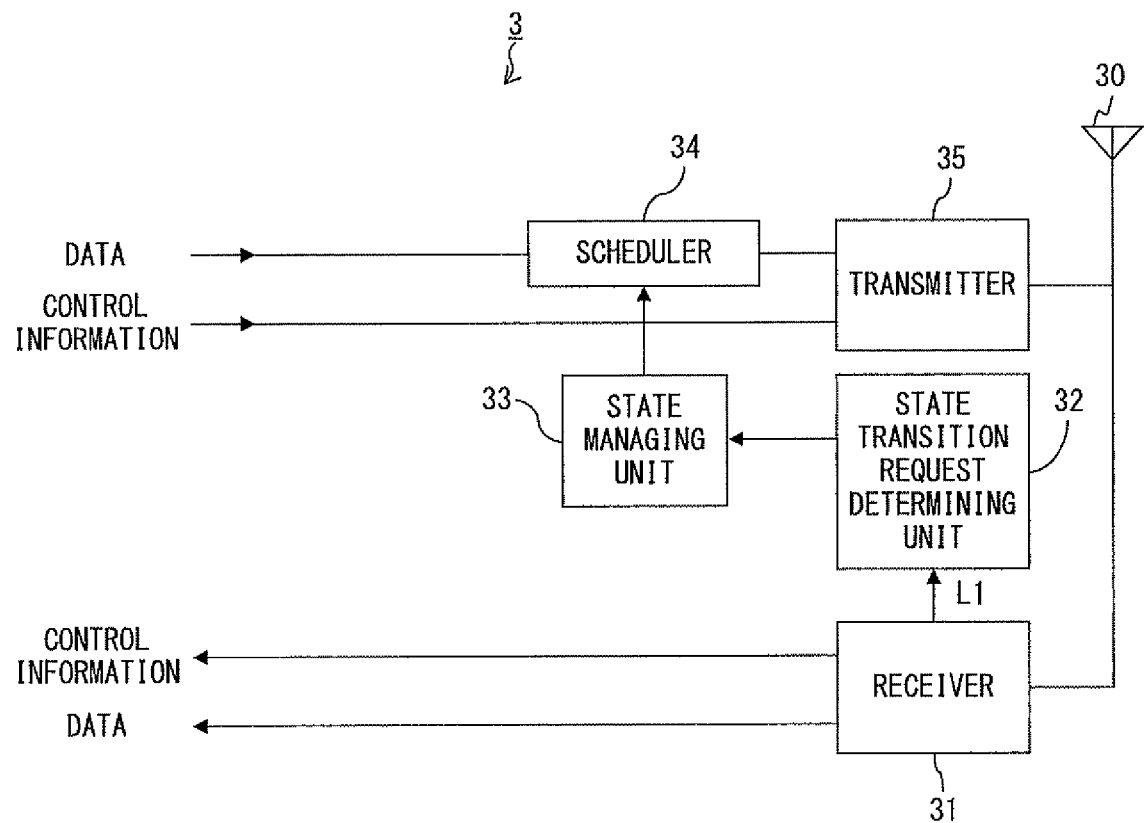
F I G. 5

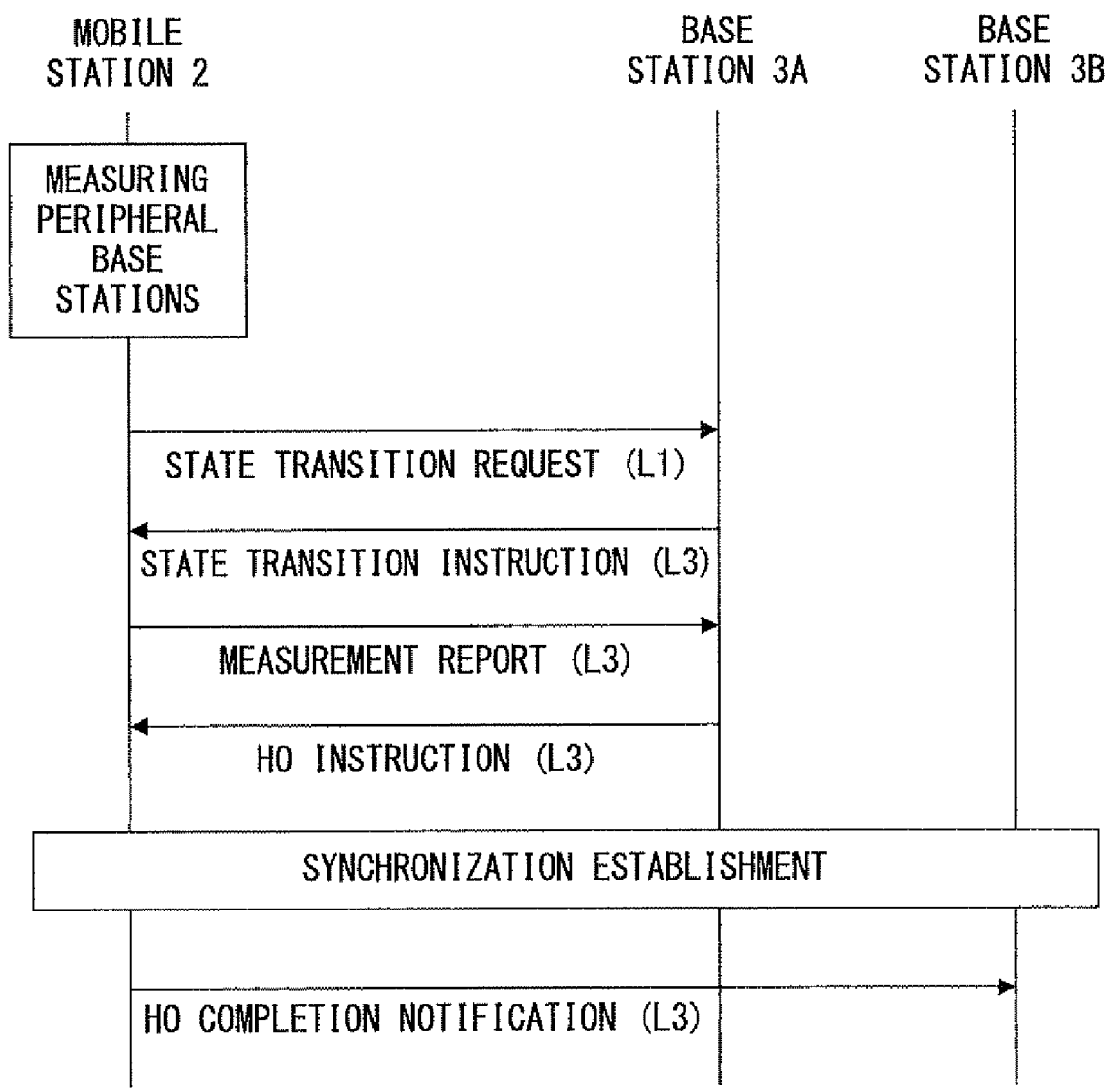
F I G. 7

| USER ID | STATE TRANSITION REQUEST BIT | |
|---|---|---|

FIG. 8

| USER ID | BASE STATION ID | |
|---------|-----------------|--|

F I G. 1 4

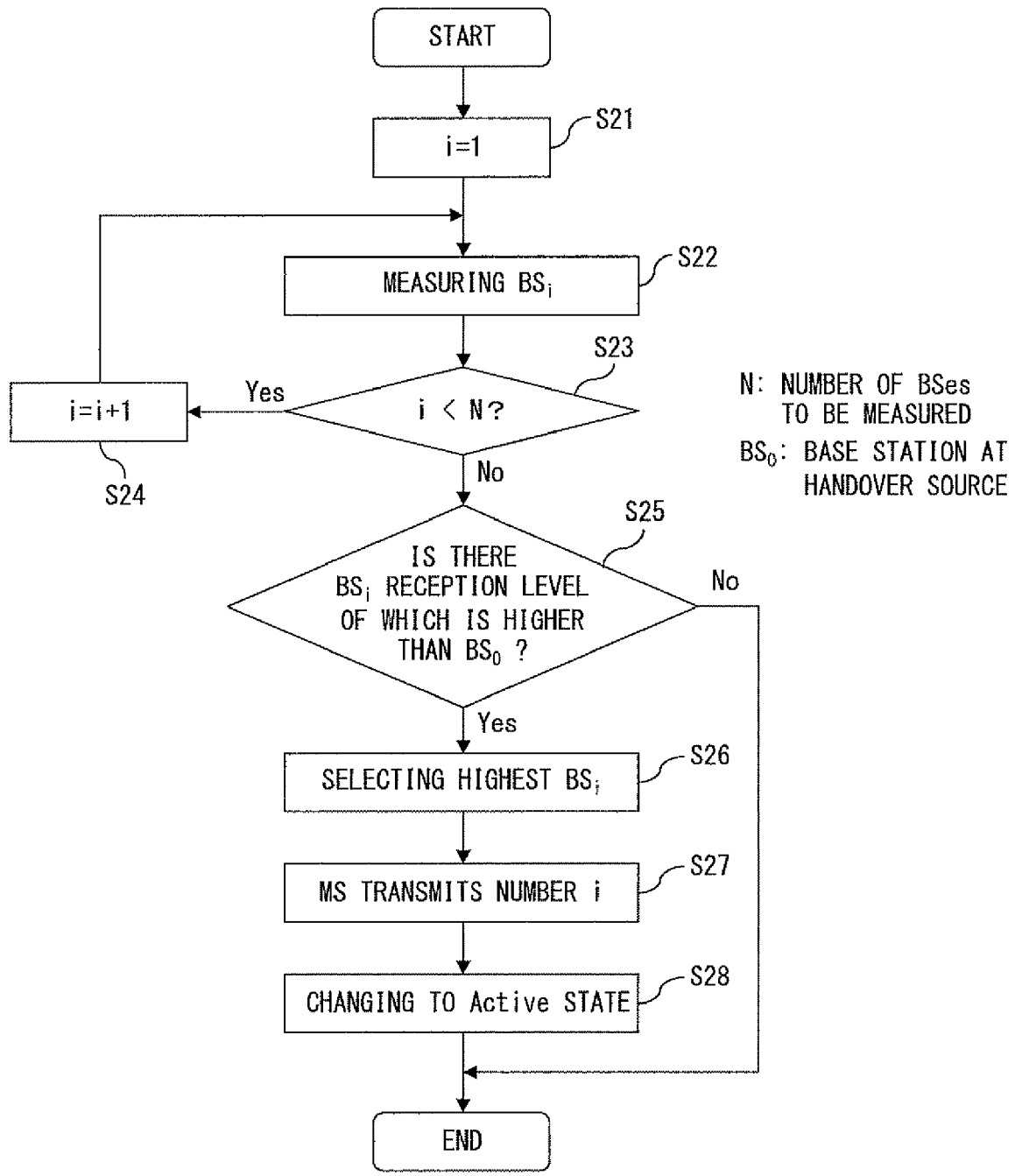
F I G. 15

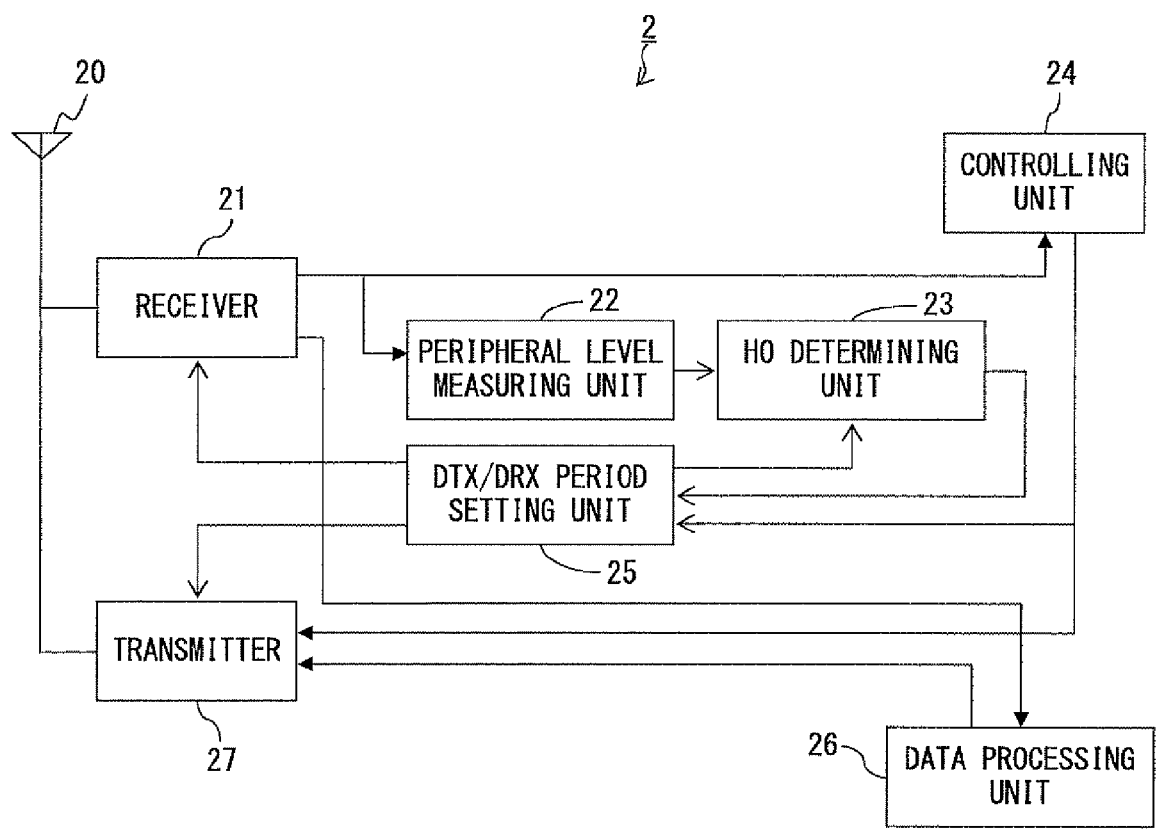
F I G. 17

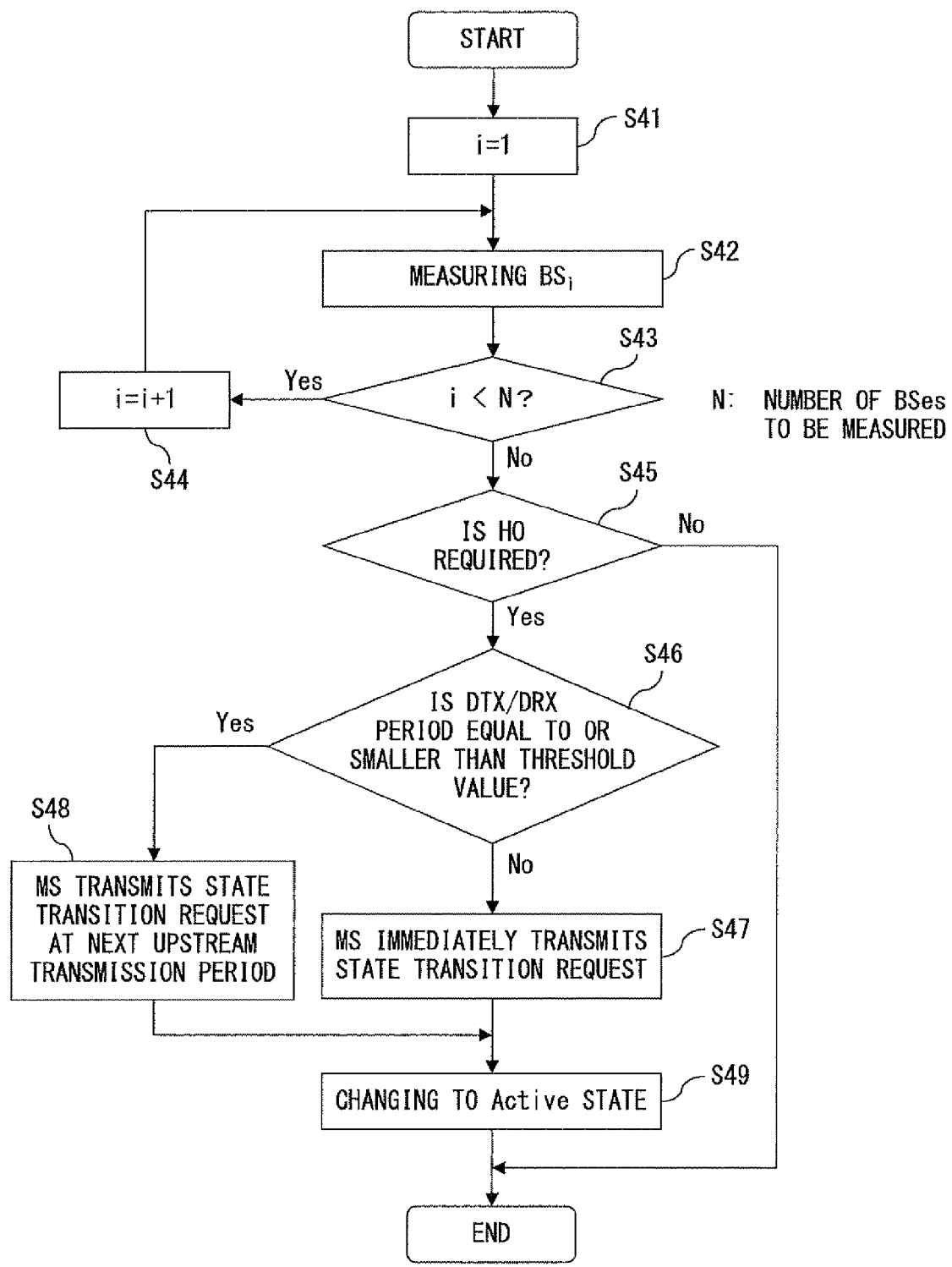
F I G. 1 8

INTERMITTENT COMMUNICATION SYSTEM, BASE STATION APPARATUS AND MOBILE STATION APPARATUS

CROSS-REFERENCE TO RELATED APPLICATION

This application is based upon and claims the benefit of priority of the prior PCT Application No. PCT/JP2007/050878, filed on Jan. 22, 2007, the entire contents of which are incorporated herein by reference.

FIELD

The present invention relates to a handover technique in a mobile communication system where an intermittent communication can be made.

BACKGROUND

In mobile communication systems such as a cellular phone, etc., third-generation CDMA (Code Division Multiple Access) systems are currently providing various types of services. Mobile communication systems of the next generation or later, which enable a faster communication, are currently under study. LTE (Long Term Evolution) is currently under study in 3GPP (3rd Generation Partnership Project). For example, in LTE, a method by which a mobile station applies intermittent reception (DRX: discontinuous reception) during not only a standby state but also a communication state. This aims at reducing power consumed by the mobile station because power increases with a speedup of a communication.

Figure 1:
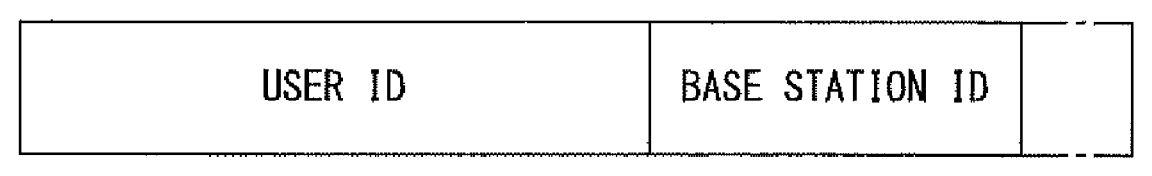

FIG. 1 is a schematic diagram illustrating the timings of intermittent transmission and reception of a mobile station. An upper portion illustrates the timing of a transmission from a base station to the mobile station, whereas a lower portion illustrates the timing of a transmission from the mobile station to the base station. As illustrated in FIG. 1, the mobile station periodically verifies whether or not a data transmission to the mobile station itself is made while applying the intermittent reception. Also for an upstream transmission, the mobile station periodically makes an intermittent transmission (DTX: discontinuous transmission) in order to maintain the synchronization of an intermittent communication.

In the meantime, in conventional technology, if it becomes necessary to switch a base station at a connection destination by performing a handover due to a move of the mobile station during the intermittent communication, the mobile station initially needs to change the communication state from the intermittent communication state to an active state before executing the handover process. If the mobile station determines to require a handover, it transmits a state transition request to change the communication state to the active state to the base station at the next intermittent transmission timing.

FIG. 2 illustrates data transmission/reception timings on the side of the mobile station when a handover is performed during an intermittent communication in the conventional technology. If the mobile station determines to require a handover on the basis of measurement results by periodically measuring a reception level such as a reception signal intensity, etc., it transmits the state transition request to the base station at the next transmission timing. The base station that receives the state transition request changes the communication state of the device, namely, the base station itself from the intermittent communication state to the active state, and transmits a message to instruct the mobile station to change from the intermittent communication state to the active state at the transmission timing of the base station. Upon completion of transition from the intermittent communication state to the active state in both of the base station and the mobile station, a handover is performed thereafter.

FIG. 3 is an operational sequence when a handover is performed at the time of an intermittent communication in the conventional technology. With the conventional technology, the state transition request to change to the active state needs to be transmitted at intermittent transmission timing. Also a state transition instruction from the base station that receives the state transition request needs to be transmitted to the mobile station at the intermittent transmission timing. Accordingly, a handover during an intermittent transmission/reception period has a problem of a longer delay time than that of the normal communication (active) state as illustrated in FIG. 3. Additionally, there is a problem such that the handover is not properly performed because it is not complete within a predetermined duration due to a prolonged time required until the transmission of the state transition request.

Other handover techniques include a technique (for example, Patent Document 1) for changing to a wireless communication establishment state on the basis of an RRC connection request if it becomes necessary to perform a handover at the time of an intermittent communication, a technique (for example, Patent Document 2) by which a terminal making an intermittent communication forms a paging group and a soft handover is taken into account in a series of sequence, a technique (for example, Patent Document 3) for performing a handover by using a paging channel in an asynchronous system, and a technique (for example, Patent Document 4) for performing a handover under the initiative of a base station.

An object of the present invention is to provide a technique for changing from an intermittent communication state to a normal communication state earlier in a mobile station and a base station, which need to perform a handover, etc.

Patent Document 1: Japanese Laid-open Patent Publication No. 2005-286807
Patent Document 2: Japanese Laid-open Patent Publication No. 2004-194015
Patent Document 3: Japanese Laid-open Patent Publication No. 2004-504783
Patent Document 4: Japanese Laid-open Patent Publication No. 2000-69523

SUMMARY

To overcome the above described problems, an intermittent communication system according to the present invention is an intermittent communication system where an intermittent communication can be made between a base station apparatus and a mobile station apparatus. The mobile station apparatus includes a transmitting unit configured to transmit a request to start a normal communication after stopping an intermittent communication at timing different from the intermittent communication if a handover is determined to be required, a transiting unit configured to transit from the intermittent communication to the normal communication after the transmitting unit transmits the request, and a handover performing unit configured to perform a handover upon completion of transiting to the normal communication by the transiting unit.

The mobile station apparatus in the intermittent communication state immediately transmits to the base station apparatus the request to change the communication to the normal communication state without waiting for the next intermittent transmission timing if it determines a handover to be required. Moreover, the mobile station apparatus transmits the request, and at the same time, it transits from the intermittent communication to the normal communication. Upon completion of transiting to the normal communication, a handover is started. Since the request is transmitted to the base station apparatus regardless of intermittent transmission timing, the amount of time required for the handover process can be reduced.

The request may be configured with a handover request including base station apparatus identification information for identifying a base station apparatus at a handover destination, and the transiting unit may start to transit from the intermittent communication to the normal communication when the handover request is recognized. The communication state is transited on the basis of the handover request received during the intermittent communication, and the handover process is executed upon completion of changing the state, whereby the handover process can be started earlier.

The request is transmitted from the mobile station apparatus to the base station apparatus by using a common channel. Additionally, the request may be generated as information of L1 (Layer 1: physical layer) and transmitted by the transmitting unit if the period of making an intermittent communication is larger than a predetermined threshold value, or the request may be generated as information of L3 (Layer 3: network layer) and transmitted at the transmission timing of the intermittent communication if the period is equal to or smaller than the predetermined threshold value.

The present invention is not limited to the above described intermittent communication system. The present invention also covers a base station apparatus and a mobile station apparatus, which apply the above described intermittent communication method, a program for causing a computer to execute a method thereof, and the like.

According to the present invention, a request for the base station apparatus to transit the state regardless of intermittent transmission timing is transmitted by using a common channel even if a handover becomes necessary during an intermittent communication. Since the request is transmitted without waiting for the next intermittent transmission timing, the amount of time required to transit from the intermittent communication state to the normal communication state is reduced. As a result, the amount of time required until the completion of a handover can be shortened. Accordingly, problems such as communication quality degradation, a failure of the handover process, etc., which occur with a prolonged handover process, can be improved.

BRIEF DESCRIPTION OF DRAWINGS

FIG. 1 illustrates the intermittent transmission and reception timings of a mobile station;

FIG. 3 is an operational sequence when a handover is performed at the time of an intermittent communication in the conventional technology;

FIG. 4 illustrates a configuration of a mobile station according to a first embodiment;

FIG. 5 illustrates a configuration of a base station according to the first embodiment;

FIG. 7 is a sequence of a process for performing a handover during an intermittent communication in a wireless communication system according to the first embodiment;

FIG. 8 is an example format of a state transition request in the first embodiment;

FIG. 14 is an example format of a handover request in the second embodiment;

FIG. 15 is a flowchart illustrating a process executed on the side of the mobile station according to the second embodiment;

FIG. 17 illustrates a configuration of a mobile station according to a third embodiment; and FIG. 18 is a flowchart illustrating a process executed on the side of the mobile station according to the third embodiment.

DESCRIPTION OF EMBODIMENTS

Figure 2:
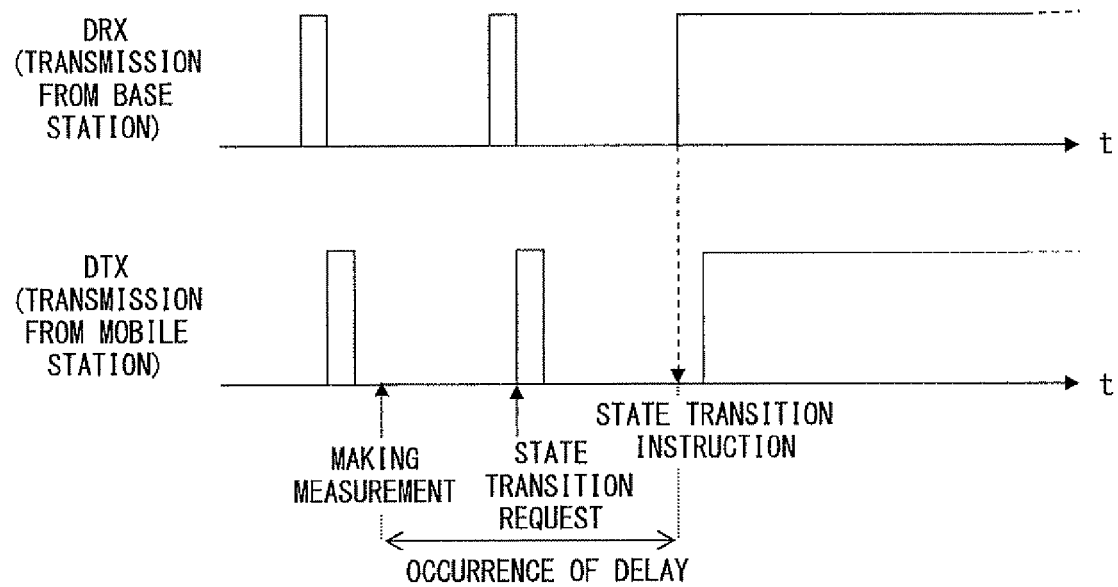
FIG. 2 illustrates data transmission/reception timings on the side of the mobile station when a handover is performed during an intermittent communication in conventional technology.

Embodiments according to the present invention are described in detail below with reference to the drawings. A wireless communication system 1 described below is configured by including a mobile station 2 and a base station 3. A plurality of base stations 3 exist in the periphery of the mobile station 2. The mobile station 2 measures a reception level such as a reception signal intensity, etc. from each of the base stations, and decides a base station 3 at a connection destination from among the plurality of base stations 3 on the basis of the measured reception levels.

In the wireless communication system 1 of the next generation or later such as LTE, etc., both of the mobile station 2 and the base station 3 make an intermittent transmission/reception (DTX, DRX) even during a communication in order to save power. However, if a handover is determined to be required on the basis of a measured reception level, the communication state is transited to a normal communication state in order to perform the handover.

First Embodiment

FIG. 4 illustrates a configuration of the mobile station 2 according to the first embodiment. The mobile station 2 includes an antenna 20, a receiver 21, a peripheral level measuring unit 22, a handover determining unit (denoted as an HO determining unit in FIG. 4) 23, a controlling unit 24, an intermittent transmission/reception period setting unit (DTX/DRX period setting unit in FIG. 4: hereinafter referred to as a period setting unit) 25, a data processing unit 26 and a transmitter 27.

The antenna 20 is used to transmit a signal to the base station 3, or to receive a signal transmitted from the base station 3. In FIG. 4, the transmission antenna and the reception antenna are collectively represented as one antenna.

The receiver 21 performs amplification and demodulation processes for a signal received via the antenna 20. The reception level of the demodulated signal is provided to the peripheral level measuring unit 22.

The peripheral level measuring unit 22 respectively measures the reception levels of the base stations 3 positioned in the periphery of the mobile station 2.

The handover determining unit 23 determines whether or not to perform a handover on the basis of results of the measurement made by the peripheral level measuring unit 22. If the handover determining unit 23 determines to perform a handover, it provides the period setting unit 25 with information about performing a handover.

Upon receipt of the information about performing a handover from the handover determining unit 23, the period setting unit 25 resets the period of intermittent transmission/reception. For example, by setting the value of the period of intermittent transmission/reception to 0, or by setting the period to none, the mobile station 2 executes a communication state transition process from the intermittent communication state to the normal communication state, namely, the active state. "The active state" represents a communication state in contrast to a standby state in the current-generation communication systems. However, in the next-generation systems such as LTE, etc., an intermittent communication can be made even during a communication. Therefore, a communication state in contrast to the intermittent communication state, namely, the state where a non-intermittent communication is made is defined as "the active state".

The data processing unit 26 processes information obtained by demodulating a signal in the receiver 21, and provides the transmitter 27 with data to be transmitted to the base station 3. The data that the data processing unit 26 provides to the transmitter 27 includes the state transition request to request the base station 30 to change the communication state from the intermittent communication state to the active state. The transmitter 27 executes a modulation process for the data. The signal modulated by the transmitter 27 is transmitted to wireless space via the antenna 20.

The controlling unit 24 performs various types of controls on the basis of input information. If a handover is determined to be required in the intermittent communication state, the controlling unit 24 performs a control, for example, to instruct the period setting unit 25 to reset the period of intermittent transmission/reception, or to cause the transmitter 27 to execute a modulation process for transmitting the state transition request to the base station 3 as L1 information. In this embodiment, the controlling unit 24 transmits the above described state transition request to the base station 3 regardless of intermittent transmission timing even in the intermittent communication state.

FIG. 5 illustrates a configuration of the base station 3 according to this embodiment. The base station 3 includes an antenna 30, a receiver 31, a state transition request determining unit 32, a state managing unit 33, a scheduler 34 and a transmitter 35.

The antenna 30 receives a signal from the mobile station 2, and transmits a signal to the mobile station 2. The transmission antenna and the reception antenna are collectively depicted as one antenna in FIG. 5 similar to the antenna 20 of the mobile station 2 illustrated in FIG. 4.

The receiver 31 executes amplification and demodulation processes for a signal received via the antenna 30. Control information and data of information obtained with the demodulation process are provided to an upper layer, and information received with L1 is provided to the state transition request determining unit 32.

The information (state transition request) of L1 within the information transmitted from the mobile station 2 is provided to the state transition request determining unit 32, which then determines the contents of the information. The state transition request is a request signal for causing the base station 3 to change to a state able to perform a handover by switching the communication state of the base station 3 from the intermittent communication state to the active state, as stated earlier with reference to FIG. 4.

The state managing unit 33 manages the communication state on the side of the base station 3 on the basis of results of the determination made by the state transition request determining unit 32. Specifically, the state managing unit 32 manages in which of the intermittent communication state and the active state a communication is made with each mobile station 2 subordinate to the base station 3.

The scheduler 34 controls data transmission timing according to the management status of the communication state of each mobile station 2 subordinate to the base station 3 in the state managing unit 33. Data the transmission timing of which is controlled by the scheduler 34 includes the state transition instruction for instructing the mobile station 2 to change the communication state from the intermittent communication state to the active state. The state transition instruction signal is transmitted to the mobile station 2 in accordance with the state transition request received from the mobile station 2.

The transmitter 35 executes the modulation process for data or various types of control information. A signal obtained with the modulation process is transmitted to wireless space via the antenna 30. The above described state transition instruction is transmitted regardless of intermittent transmission timing even during an intermittent communication.

Figure 6:
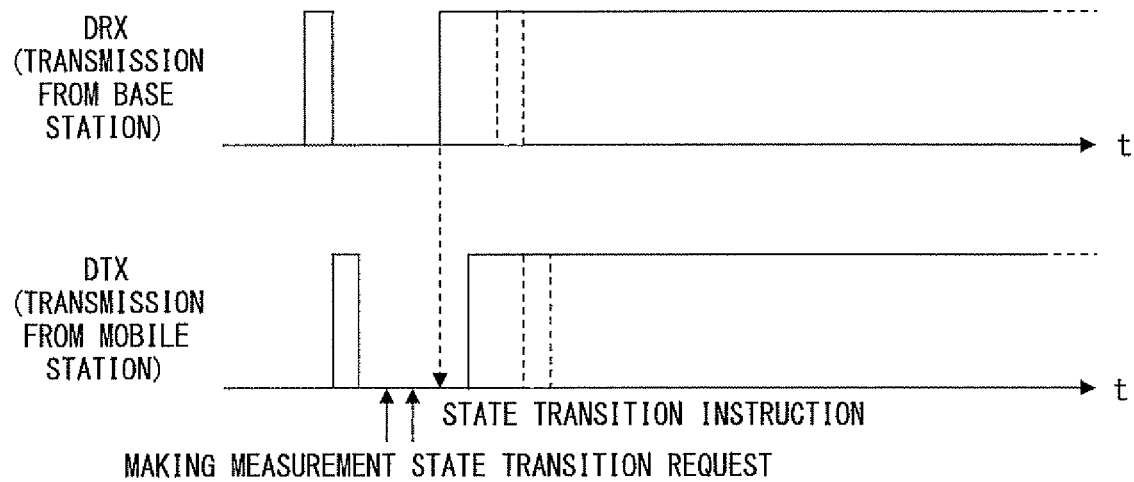
FIG. 6 is an explanatory view of the transmission/reception timings of data in the mobile station according to the first embodiment.

FIG. 6 is an explanatory view of data transmission/reception timings in the mobile station 2 according to this embodiment. The upper portion of FIG. 6 illustrates the timing of receiving data from the base station 3, whereas the lower portion of FIG. 6 illustrates the timing of transmitting data to the base station 3. The horizontal axis represents time t, whereas the vertical axis represents a duration during which the level is not zero as a duration capable of transmitting/receiving data.

When the mobile station 2 detects that the reception level drops as a result of the measurement during an intermittent communication, it determines to require a handover. Then, the mobile station 2 transmits the state transition request to the base station 3 to request the base station 3 to change from the intermittent communication state to the active state in order to perform a handover.

The mobile station 2 according to this embodiment transmits the state transition request at timing different from the intermittent transmission timing of an intermittent communication. Namely, if the mobile station 2 determines to require a handover, it immediately transmits the state transition request to a base station 3 at a connection destination without waiting for the next intermittent transmission timing. The transmission at this time is made by using not an occupied channel assigned to the normal intermittent transmission timing but a common channel such as a random access channel, etc. Such a channel is not suitable for transmitting L3 information such as a measurement report like a normal channel, but can transmit information such as the state transition request as L1 information due to its small amount of data. Accordingly, the random access channel is applicable.

The base station 3 receives the common channel such as the random access channel, etc. regardless of the intermittent transmission/reception timing even when the mobile station 2 is in the intermittent transmission/reception state, and can receive from the mobile station 2 the state transition request that is transmitted at timing other than the intermittent transmission timing.

The mobile station 2 requests the base station 3 to change the communication state by transmitting the state transition request to the base station 3, and switches the communication state of the mobile station 2 itself from the intermittent communication state to the active state.

To switch to the active state in the mobile station 2, the reception timing is initially changed from the intermittent reception to the active state. By changing the reception state to the active state in advance, the mobile station 2 can receive the state transition instruction that is L3 information from the base station 3.

Upon receipt of the state transition request from the mobile station 2, the base station 3 transmits the state transition instruction to the mobile station 2 after changing the communication state of the base station 3 itself from the intermittent communication state to the active state. The mobile station 2 that has transited its state from the intermittent reception state to the active state receives the state transition instruction from the base station 3. Then, the mobile station 2 transits from the intermittent transmission to the active state and starts the handover process upon completion of transition from the intermittent communication state to the active state. Before receiving the state transition instruction from the base station 3 (for example, at the timing of transmitting the state transition request signal), not only the reception state but also the transmission state can be made active (the transmission/reception state can be changed to non-intermittent transmission/reception state).

When a handover becomes necessary due to a drop in the reception level of the mobile station 2 as illustrated in FIG. 6, the mobile station 2 transmits the state transition request to the base station 3 with L1 without waiting for the next intermittent transmission timing. Accordingly, the state transition process can be executed earlier than the case of transmitting the state transition request at the next intermittent transmission timing, leading to a reduction in the amount of time required to transit the state. The amount of time required to execute the state transition process is reduced, whereby the handover process can be started earlier. As a result, the amount of time required until the completion of the handover process can be decreased.

A method for transmitting the state transition request at timing different from the intermittent transmission timing is specifically described next.

FIG. 7 is a sequence of a process for performing a handover during an intermittent communication in a wireless communication system 1 according to this embodiment. Assume that a base station 3 connected before the handover, and a base station 3 at a connection destination after the handover are base stations 3A and 3B, respectively.

If the mobile station 2 determines to require a handover as a result of measuring the reception levels of peripheral base stations 3, it transmits the state transition request to the base station 3A. The conventional state transition request is transmitted as L3 information by using an individual channel. In contrast, the state transition request is transmitted as L1 information by using a common channel such as a random access channel, etc. in this embodiment.

The base station 3A that receives the state transition request changes the communication state of the base station itself to the active state, and notifies the mobile station 2 of scheduling information, etc. by transmitting the state transition instruction to the mobile station 2. The mobile station 2 transmits a measurement report to the base station 3A after receiving the state transition instruction. In response to the measurement report from the mobile station 2, the base station 3A transmits a handover instruction to the mobile station 2 after negotiating with the base station 3B at the handover destination. Upon completion of changing to the active state in both of the mobile station 2 and the base station 3A, the handover process is started. A subsequent process, namely, the process with which synchronization is established and the mobile station 2 transmits a handover completion notification to the base station 3B upon completion of the handover is similar to a conventional process and a known technique.

Figure 8:
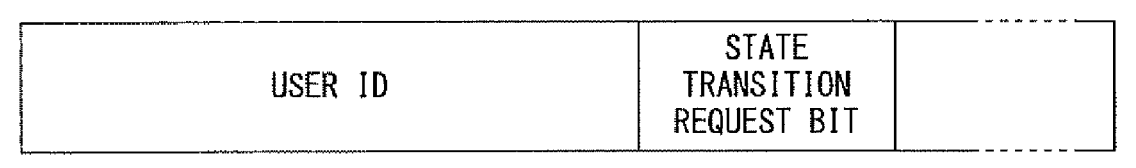

FIG. 8 illustrates an example format of the state transition request in this embodiment. The state transition request is configured by including user identification information (user ID in FIG. 8), and a state transition request bit.

The user identification information is information for identifying the mobile station 2. In the wireless communication system 1 including the base station 3, the mobile station 2 is uniquely decided on the basis of the user identification information. If the state transition request bit is set to, for example, 1, it represents the state transition request. If the state transition request bit is set to 0, it represents that the state transition request is not made. In this embodiment, only the notification for requesting the side of the base station to transit the state is exemplified as information transmitted to the base station 3. However, the information transmitted to the base station 3 is not limited to this one. By respectively presetting values for various types of requests in accordance with various types of specifications hereinafter formulated in LTE, various types of information can be notified to the base station 3 by using the random access channel.

Here, the random access channel is equivalent to, for example, a synchronized random access channel in LTE. The synchronized random access channel is used when an upstream link between the base station 3 and the mobile station 2 that is a terminal is temporally synchronized by the base station 3. The mobile station 2 secures resources for an upstream data transfer by using this channel. With the procedures for a synchronized random access, latency can be reduced as a whole.

The mobile station 2 according to this embodiment transmits the state transition request in the format illustrated in FIG. 8 to the base station 3 as L1 information by using the random access channel, etc. As a result, necessary information can be notified from the mobile station 2 to the base station 3 without waiting for the intermittent transmission timing while reducing the amount of data in comparison with L3 information.

A method for executing the above described handover process in each of the sides of the mobile station 2 and the base station 3 is described with reference to flowcharts.

Figure 9:
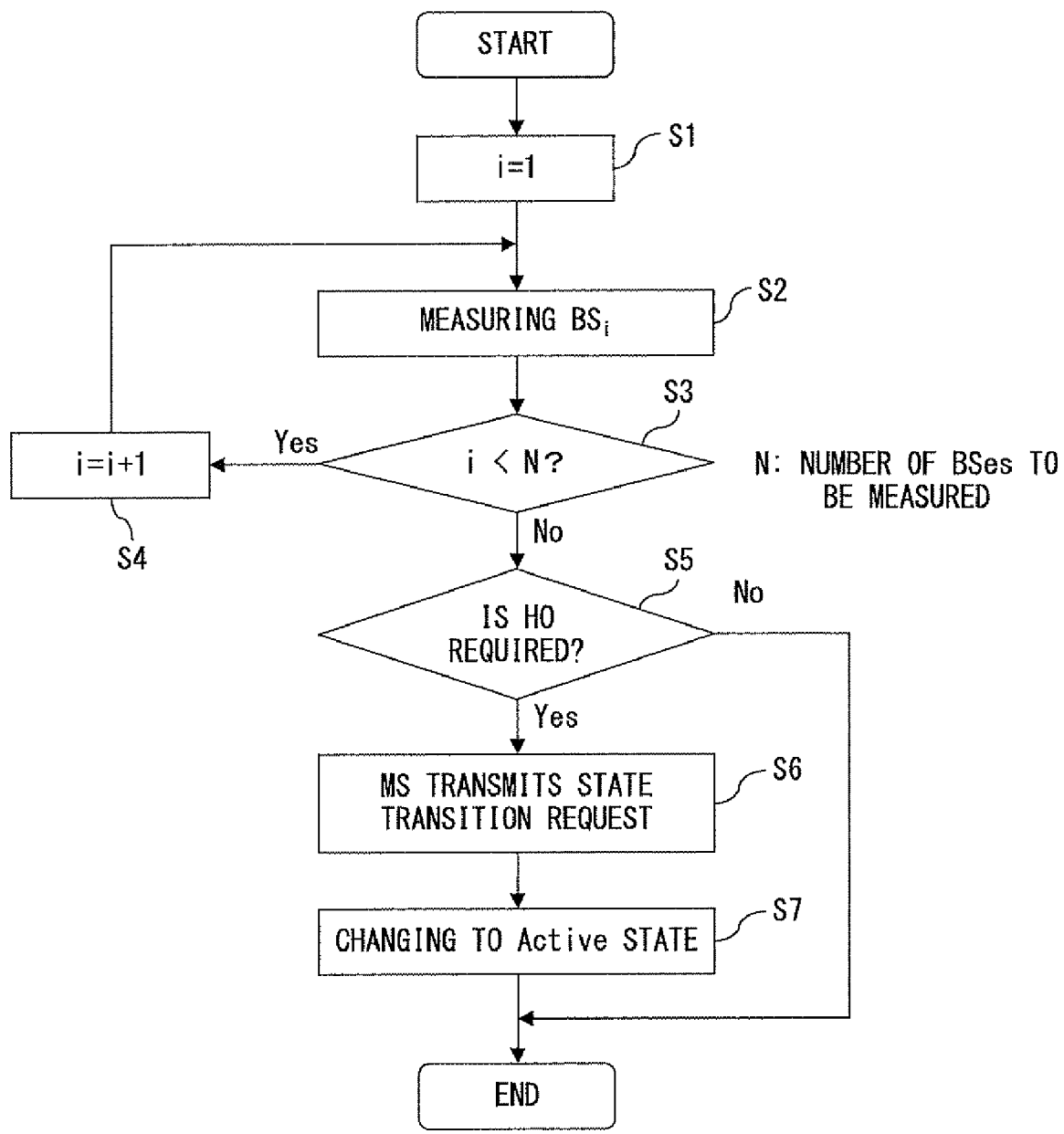
FIG. 9 is a flowchart illustrating a process executed on the side of the mobile station according to the first embodiment.

FIG. 9 is a flowchart illustrating the process executed on the side of the mobile station 2 according to this embodiment. The process illustrated in FIG. 9 is executed according to the measurement period of the reception level from the base station 3, the request from the base station 3, etc.

Initially, in step S1, 1 is set as the initial value of identification information i for respectively identifying a plurality of base stations 3 positioned in the periphery of the mobile station 2. Then, in step S2, the reception level of an ith base station is measured. In step S3, whether or not the value of i is smaller than the number of base stations (assumed to be N) to be measured is determined. If i is smaller than the number of base stations N to be measured, the process goes to step S4, in which i is incremented by 1. The process then goes back to step S2. If the value of i that is the identification information of the peripheral base station becomes equal to the number of base stations N to be measured, it is determined that the reception levels of all of the base stations 3 have been measured. Then, the process goes to step S5.

In step S5, whether or not to require a handover is determined on the basis of the reception levels measured for the N base stations 3. If the handover is determined not to be required, the process is terminated. If the handover is determined to be required, the process goes to step S6.

The mobile station 2 immediately transmits the state transition request to the base station 3 regardless of the intermittent transmission timing in step S6, changes the communication state from the intermittent communication state to the active state in step S7, and terminates the process. As stated earlier, after the process illustrated in FIG. 9 is terminated, the mobile station 2 receives the scheduling information included in the state transition instruction from the base station 3, and starts the handover process in accordance with the handover instruction from the base station 3.

Figure 10:
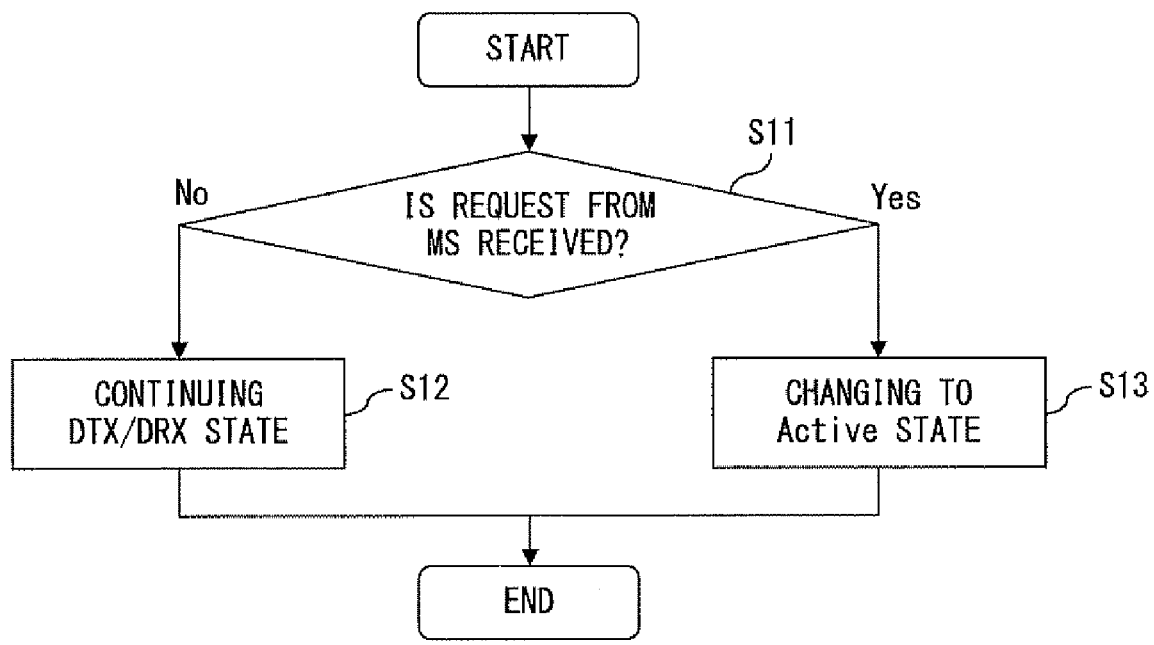
FIG. 10 is a flowchart illustrating a process executed on the side of the base station according to the first embodiment.

FIG. 10 is a flowchart illustrating a process executed on the side of the base station 3 according to this embodiment. The process illustrated in FIG. 10 is executed respectively for all of mobile stations 2 that are in the intermittent communication state within the area of the base station 3.

Initially, in step S11, whether or not the state transition request is received from the mobile station 2 is determined. If the state transition request is not received, the process goes to step S12, in which the intermittent communication state is continued without executing a process, and the process is terminated. If the state transition request is received from the mobile station 2, the process goes to step S13, in which the communication state of the base station 3 is changed from the intermittent communication state to the active state. Here, the process is terminated.

After being transited to the active state, the base station 3 notifies the mobile station 2 of scheduling information by transmitting the state transition instruction to the mobile station 2 that transmits the state transition request, and issues the handover instruction to the mobile station 2 in accordance with the measurement report further transmitted from the mobile station 2. The mobile station 2 that receives the handover instruction starts the handover.

As described above, with the wireless communication system 1 according to this embodiment, the state transition request is transmitted as L1 information by using a common channel, because the amount of data of L1 information is smaller than that of L3 information. The common channel is used to transmit the state transition request, whereby the state transition request can be transmitted to the base station 3 at timing different from the intermittent transmission timing when it becomes necessary to perform a handover in the mobile station 2 that is making an intermittent communication. Accordingly, the mobile station 2 can immediately transmit the state transition request when determining to require a handover, and the base station 3 can execute the process for transiting the communication state to the active state earlier. By reducing the amount of time required to transit the state, the handover can be started earlier, and the duration required until the completion of the handover process can be shortened. This contributes to improvements in problems such as communication quality degradation, a failure of the handover process, etc., which occur with a prolonged time required for the handover.

Second Embodiment

A wireless communication system 1 according to the second embodiment is characterized in changing from the intermittent communication state to the active state on the basis of information when the information about peripheral base stations is notified as L1 information from the mobile station 2 to the base station 3.

Figure 11:
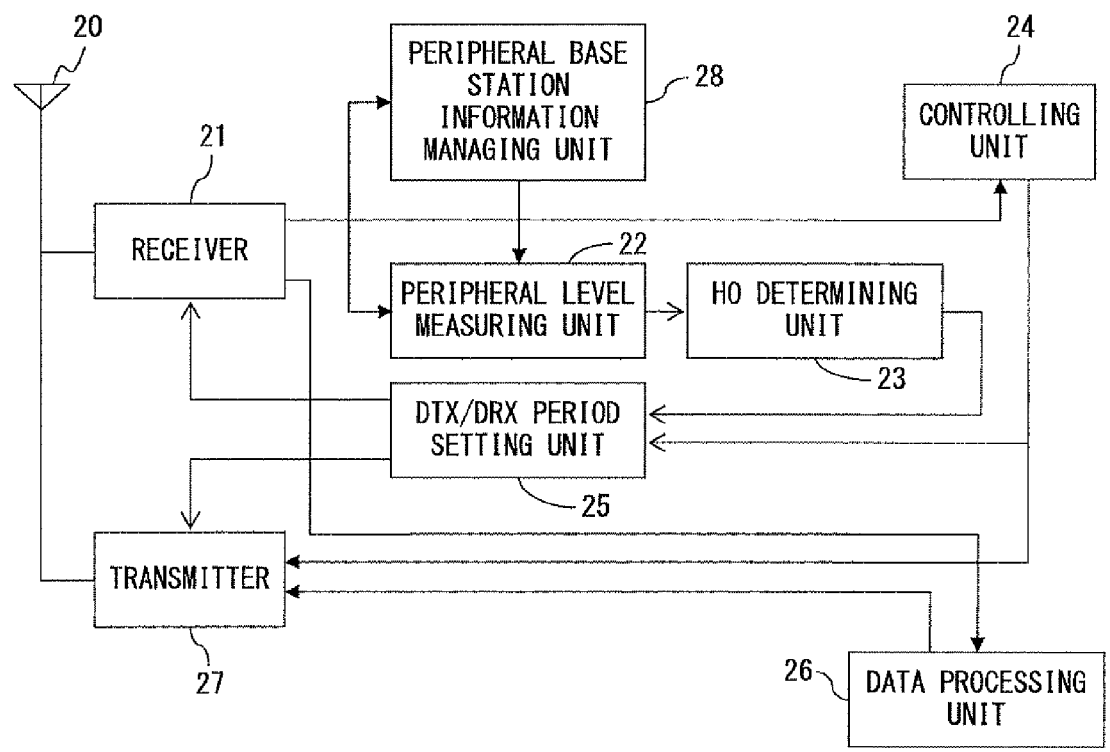
FIG. 11 illustrates a configuration of a mobile station according to a second embodiment.

FIG. 11 illustrates a configuration of the mobile station 2 according to the second embodiment. The mobile station 2 according to this embodiment is different from that according to the above described first embodiment in the point of further including a peripheral base station information managing unit 29. Other constituent elements are similar to those of FIG. 4.

The peripheral base station information managing unit 28 holds information about peripheral base stations, which is received from a base station 3 at a connection destination. Here, the information about peripheral base stations is identification information for respectively identifying the peripheral base stations within the mobile station 2.

Figure 12:
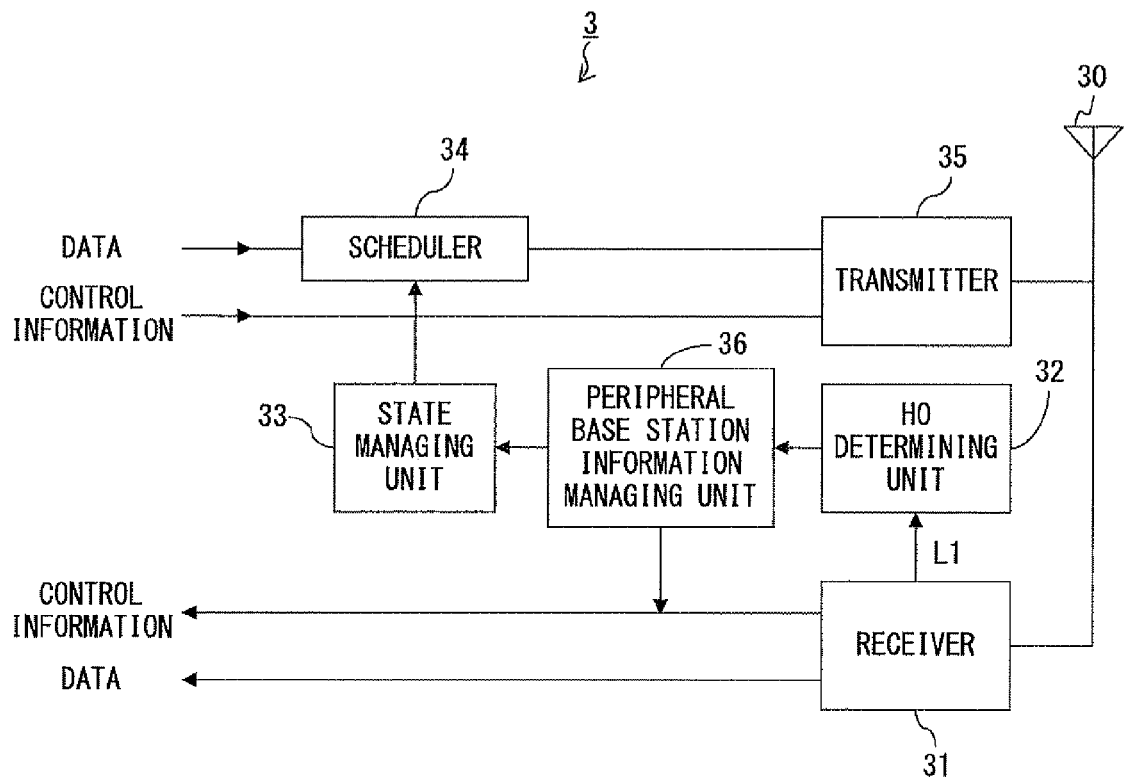
FIG. 12 illustrates a configuration of a base station according to the second embodiment.

FIG. 12 illustrates a configuration of the base station 3 according to this embodiment. The base station 3 according to this embodiment is different from that according to the above described first embodiment in the point of further including a peripheral base station information managing unit 36. Other constituent elements are similar to those of FIG. 5.

The peripheral base station managing unit 36 provides a state managing unit 33 with information about a base station at a handover destination if a handover is determined to be required on the basis of information indicating whether or not to require the handover, which is input from a handover determining unit 32, and provides an upper layer with the information as control information. The state managing unit 33 recognizes that the handover is required on the basis of the information about the base station at the handover destination, which is received from the peripheral base station information managing unit 36, and controls the communication state on the side of the base station.

Figure 13:
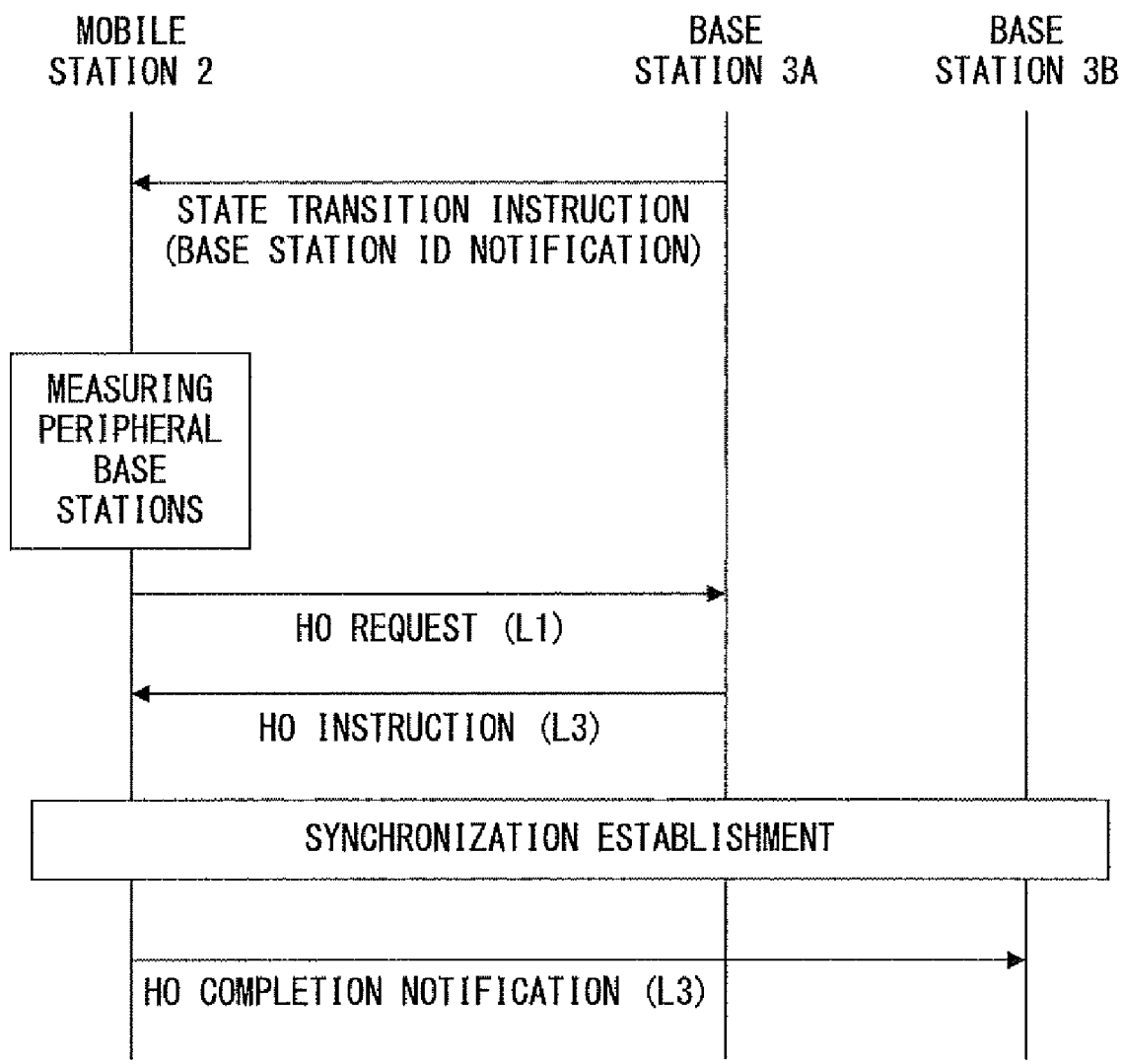
FIG. 13 is a sequence of a process for performing a handover during an intermittent communication in a wireless communication system according to the second embodiment.

FIG. 13 is a sequence of a process for performing a handover during an intermittent communication in a wireless communication system 1 according to the second embodiment. In a similar manner as in the first embodiment, a base station 3 to which the mobile station 2 is connected before a handover, and a base station 3 at a handover destination are denoted as base stations 3A and 3B, respectively. Differences from the sequence of the wireless communication system according to the above described first embodiment illustrated in FIG. 7 are mainly described.

Initially, the base station 3A transmits the state transition instruction to the mobile station 2 in order to change the communication state from the active state to the intermittent communication state. The state transition instruction transmitted here includes information for identifying peripheral base stations, which is held in the base station 3A. The mobile station 2 that receives the state transition instruction from the base station 3A transits the communication state to the intermittent communication state in accordance with the instruction, and holds the received information in the peripheral base station information managing unit 28.

The mobile station 2 that is making an intermittent communication transmits a handover request (HO request in FIG. 13) to the base station 3A as L1 information by using a random access channel, etc. if it determines to require a handover due to a drop in the reception level. Since the handover request is transmitted as L1 information in this embodiment, it can be transmitted at timing different from intermittent transmission timing.

The handover request includes the base station identification information for indicating the base station at the handover destination. The mobile station 2 initially transits its communication state from the intermittent reception state to the active state after transmitting the handover request, and stands by in the state able to receive L3 information from the base station 3A. The base station 3A determines that the handover request has been received on the basis of the L1 information, and transmits a handover instruction to the mobile station 2 after negotiating with the base station 3B at the handover destination.

Upon receipt of the handover instruction from the base station 3A, the mobile station 2 changes its communication state from the intermittent transmission state to the active state. In the above described first embodiment, the timings of changing from the intermittent reception/transmission to the active state in the mobile station 2 are those after the state transition request is transmitted and after the state transition instruction is received as illustrated in FIG. 6. In contrast, these timings are those after the handover request is transmitted and after the handover instruction is received in this embodiment.

Thereafter, synchronization is established similar to the sequence in the above described first embodiment illustrated in FIG. 7, and the handover is performed. Upon completion of the handover process, a handover completion notification is transmitted to the base station 3B at the handover destination, and the process is terminated.

The state transition instruction notified to the mobile station 2 in advance is configured by including the base station identification information (denoted as a base station ID in FIG. 13). The base station identification information may be a value simply assigned by the base station 3A. The base station 3A and the mobile station 2 hold the same value. The mobile station 2 notifies the base station 3A at the handover source by including the base station identification information in L1 information as described above. Therefore, it is desirable to reduce the amount of data of the information. For example, if the number of peripheral base stations is 10, it is sufficient to secure 4 bits as the amount of data.

FIG. 14 is an example format of the handover request in this embodiment. The handover request is configured by including user identification information (user ID in FIG. 14) and the base station identification information (base station ID in FIG. 14).

Information notified to the base station 3 with the handover request is composed of the user identification information for identifying the mobile station 2, and the base station identification information indicating a peripheral base station at a handover destination. Here, an intermittent communication is being made even during, for example, a communication other than a standby state in LTE. Therefore, the base station 3 that receives the handover request illustrated in FIG. 14 recognizes that the transition of the communication state is required on the basis of reception of the handover request, and executes the state transition process for the communication state.

Unlike the above described first embodiment, this embodiment eliminates the need for the process of transmitting/receiving information about the base station 3 at the handover destination after changing the communication state on the side of the base station to the active state on the basis of the state transition request. As a result, the amount of time required for the handover process can be further reduced.

FIG. 15 is a flowchart illustrating a process executed on the side of the mobile station 2 according to the second embodiment. Differences from the process according to the first embodiment illustrated in FIG. 9 are mainly described.

Steps S21 to S24 respectively correspond to steps S1 to S4 illustrated in FIG. 9, and similar processes are executed. If it is determined in step S23 that all of peripheral base stations 3 to be measured have been measured, the process goes to step S25.

In step S25, whether or not there is a base station $BS_i$ the reception level of which is higher than that of a base station at a handover source $BS_0$ is determined on the basis of measurement results. If there is no base station the reception level of which is higher than the base station at the handover source, the process is terminated. If there is a base station the reception level of which is higher than the base station at the handover source, the process goes to step S26.

After selecting the base station $BS_i$ the reception level of which is the highest is selected in step S26, the value i of the base station identification information of the selected base station $BS_i$ is stored in the handover request, which is then transmitted to the base station at the handover source. Then, the communication state is transited to the active state in step S28, and the process is terminated. Subsequent processes are similar to those of the above described embodiment.

Figure 16:
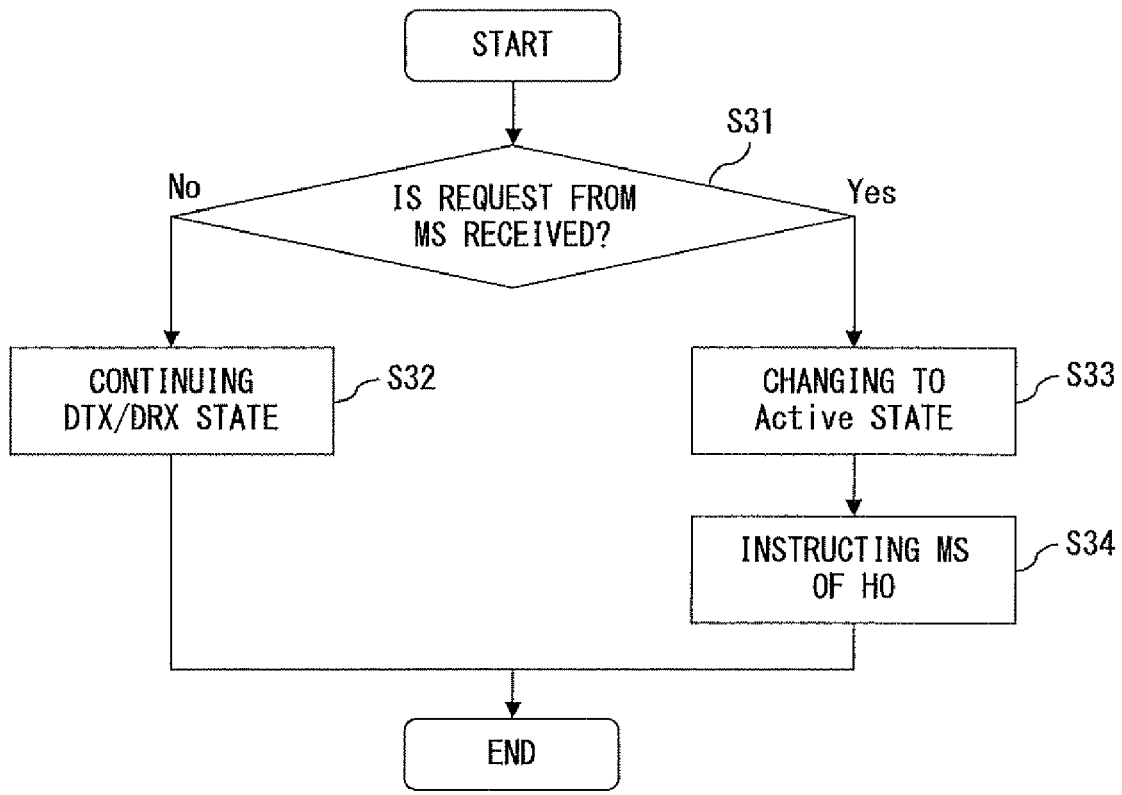
FIG. 16 is a flowchart illustrating a process executed on the side of the base station according to the second embodiment.

FIG. 16 is a flowchart illustrating a process executed on the side of the base station 3 according to the second embodiment. Similar to the base station according to the first embodiment, this process is executed respectively for all of mobile stations 2 that are in the intermittent communication state within the area of the base station 3.

Processes in steps S31 to S32, namely, the processes executed when the handover request is not received from the base station 2 among the processes illustrated in FIG. 16 are similar to those of steps S11 to S12 illustrated in FIG. 10.

If it is determined in step S31 that the handover request is received from the mobile station 2, the process goes to step S33. After changing to the active state in step S33, the handover instruction is transmitted to the mobile station 2 in step S34.

In a wireless communication system 1 according to this embodiment, the base station identification information indicating a base station at a handover destination is included in the handover request, which is transmitted as L1 information. As a result, the base station 3 can change its communication state to the active state in accordance with the identification information about the base station at the handover destination, which is included in the handover request, and can transmit the handover instruction to the mobile station 2. In the above described first embodiment, various types of processes for transiting the communication state to the active state after initially recognizing the reception of the state transition request to transit the communication state, and for starting the handover process upon recognition of the reception of the handover request are executed. In contrast, the amount of time required for the handover process can be reduced in the second embodiment.

As described above, with the wireless communication system 1 according to the second embodiment, the mobile station 2 transmits the handover request to the base station 3 by using a common channel such as a random access channel, etc. if a handover becomes necessary during an intermittent communication. Upon receipt of the handover request during the intermittent communication, the base station 3 at the handover source transits the communication state of the base station 3 itself to the active state in order to cause the mobile station 2, which is the transmission source of the handover request, to perform a handover. After the communication state of the base station 3 is changed to the active state, the handover instruction is transmitted on the basis of the base station identification information indicating the base station at the handover destination, which is included in the handover request.

The handover request is just transmitted from the mobile station 2 that requires a handover to the base station 3, and information about a base station at a handover destination is included in the handover request and notified, whereby the communication states of both of the mobile station 2 and the base station 3 can be transited. As a result, the amount of time required for the handover process can be further reduced in comparison with the method for transmitting the request to transit the communication state and the handover request separately from the mobile station 2 to the base station 3. This contributes to improvements in problems such as communication quality degradation, a failure of the handover process, etc., which occur with a prolonged time required for the handover process.

Third Embodiment

A wireless communication system 1 according to the third embodiment is characterized in performing a handover by setting a method for transmitting to the base station 3 a request to transit a communication state to the active state in accordance with the period of intermittent transmission/reception.

FIG. 17 illustrates a configuration of the mobile station 2 according to this embodiment. The mobile station 2 according to this embodiment is different from that according to the above described first embodiment in the point that the period setting unit 25 provides the handover determining unit 23 with information about the period of intermittent transmission/reception. Other constituent elements are similar to those of FIG. 4.

The handover determining unit 23 decides a method for performing a handover, specifically, a method for transmitting the request to transit the communication state to the base station 3 on the basis of the information about the period of intermittent transmission/reception, which is provided from the period setting unit 25. Contents decided by the handover determining unit 23 are provided to the period setting unit 25, which then decides the timing of transmitting the request to the base station 3 on the basis of the input information and provides the transmitter 27 with the timing, and resets the period of intermittent transmission/reception of the mobile station 2 to transit to the active state.

A configuration of the base station 3 according to this embodiment is similar to that of the base station 3 according to the first embodiment illustrated in FIG. 5. Therefore, its description is omitted here.

FIG. 18 is a flowchart illustrating a process executed on the side of the mobile station 2 according to the third embodiment. A process executed on the side of the base station 3 is similar to that of the base station 3 according to the first embodiment illustrated in FIG. 10. Here, different processes from the process of the mobile station 2 according to the first embodiment illustrated in FIG. 9 are mainly described.

Processes from an initialization process in step S41 to the determination of whether or not to require a handover in step S45 respectively correspond to steps S1 to S5 of FIG. 9, and similar processes are executed. If the handover is determined not to be required in step S45, the process is terminated. If the handover is determined to be required in step S45, the process goes to step S46.

In step S46, whether or not the period of intermittent transmission/reception is equal to or smaller than a predetermined threshold value is determined. If the period of intermittent transmission/reception is larger than the predetermined threshold value, the process goes to step S47, in which the mobile station 2 immediately transmits the state transition request to the base station 3 without waiting for the next intermittent transmission timing. If the period of intermittent transmission/reception is equal to or smaller than the predetermined threshold value in step S46, the process goes to step S48, in which the state transition request is transmitted to the base station 3 at the next intermittent transmission timing. After transmitting the state transition request, the process goes to step S49, in which the communication state of the mobile station 2 is transited to the active state. Here, the process is terminated.

If the period of intermittent transmission/reception is relatively long, a delay in the handover process increases when the transmission of the state transition request is waited until the next intermittent transmission/reception timing. Therefore, it is effective to transmit the state transition request regardless of the intermittent transmission/reception timing by using a common channel such as a random access channel, etc. However, using the random access channel can possibly cause a collision between state transition requests if a plurality of mobile stations 2 transmit the state transition requests to one base station 3.

Considering the above described point, in this embodiment, the effect of reducing a delay in the handover process is recognized to be high and a handover is performed by transmitting the state transition request regardless of the intermittent transmission timing by using a common channel such as a random access channel, etc. if the period of intermittent transmission/reception is larger than a predetermined threshold value, or the effect of reducing a delay in the handover process is recognized not to be so high and a handover is performed with precedence given to the prevention of a collision by transmitting the state transition request at the intermittent transmission timing if the period of intermittent transmission/reception is equal to or smaller than the predetermined threshold value.

In steps S47 and S48 of FIG. 18, the state transition request is transmitted from the mobile station 2 to the base station 3. However, this process is not limited to this implementation. For example, the handover request in the second embodiment may be transmitted. To implement such a handover processing method, the configuration of the mobile station 2 illustrated in FIG. 11 is implemented as a configuration for providing information about the period of intermittent transmission/reception from the period setting unit 25 to the handover determining unit 23. With this configuration, the handover determining unit 23 determines, on the basis of the information about the period of intermittent transmission/reception, whether the handover request is transmitted either as L1 information or as L3 information as in the conventional technology, whereby a similar effect can be produced.

As described above, in the state where a transmission and a reception between the base station apparatus and the mobile station apparatus are made at a predetermined intermittent period, the base station apparatus executes the signal reception process also at timing other than the predetermined periodical transmission timing of the mobile station apparatus, and allows a second signal to be transmitted to the mobile station apparatus at a period other than a predetermined period in the case of receiving the first signal from the mobile station apparatus with the reception process at timing other than the transmission timing, whereas the mobile station apparatus receives the second signal by executing the signal reception process also at timing other than predetermined periodical reception timing in the case of transmitting the first signal at timing other than the transmission timing.

What is claimed is:

1. An intermittent communication system where an intermittent communication can be made between a base station apparatus and a mobile station apparatus, wherein
the mobile station apparatus comprises
a transmitting unit configured to transmit a request to start a normal communication after stopping an intermittent communication at timing different from the intermittent communication if a handover is determined to be required,
a transiting unit configured to transit from the intermittent communication to the normal communication after the transmitting unit transmits the request, and
a handover performing unit configured to perform a handover upon completion of transiting to the normal communication by the transiting unit, wherein
the request is transmitted from the mobile station apparatus to the base station apparatus by using a common channel, and
wherein
the request is generated as information of a physical layer and transmitted by the transmitting unit if a period of making the intermittent communication is larger than a threshold value, or the request is generated as information of a network layer and transmitted at transmission timing of the intermittent communication if the period is equal to or smaller than the threshold value.

2. The intermittent communication system according to claim 1, wherein:
the request is configured with a handover request including base station apparatus identification information for identifying a base station apparatus at a handover destination; and
the transiting unit starts to transit from the intermittent communication to the normal communication if the handover request is recognized.

3. A base station apparatus making an intermittent communication with a mobile station apparatus, comprising:
a receiving unit configured to receive a request that is transmitted by the mobile station apparatus by using a common channel and intended to start a normal communication after stopping the intermittent communication;
a transiting unit configured to change from the intermittent communication to the normal communication upon receipt of the request; and
an instructing unit configured to instruct the mobile station apparatus to execute a handover process when the mobile station apparatus starts the normal communication,
wherein
the request is transmitted from the mobile station apparatus to the base station apparatus by using a common channel, and
wherein
the request is generated as information of a physical layer and transmitted by the transmitting unit if a period of making the intermittent communication is larger than a threshold value, or the request is generated as information of a network layer and transmitted at transmission timing of the intermittent communication if the period is equal to or smaller than the threshold value.

4. The base station apparatus according to claim 3, wherein:
the request includes base station apparatus identification information about a base station apparatus at a handover destination among base station apparatus identification information for identifying peripheral base station apparatuses, which is notified to the mobile station apparatus in advance when the normal communication is transited to the intermittent communication; and
the instructing unit instructs the base station apparatus at the connection destination of the mobile station apparatus to be switched in accordance with the base station apparatus identification information included in the request.

5. A mobile station apparatus making an intermittent communication with a base station apparatus, comprising:
a transmitting unit configured to transmit a request to start a normal communication after stopping an intermittent communication at timing different from the intermittent communication if a handover is determined to be required;
a transiting unit configured to transit from the intermittent communication to the normal communication after the request is transmitted; and
a handover performing unit configured to perform a handover in accordance with an instruction issued from the base station apparatus upon completion of changing to the normal communication by the transiting unit,
wherein
the request is transmitted from the mobile station apparatus to the base station apparatus by using a common channel, and
wherein
the request is generated as information of a physical layer and transmitted by the transmitting unit if a period of making the intermittent communication is larger than a threshold value, or the request is generated as information of a network layer and transmitted at transmission timing of the intermittent communication if the period is equal to or smaller than the threshold value.

6. The mobile station apparatus according to claim 5, wherein:
the request includes base station apparatus identification information about a base station apparatus at a handover destination among base station apparatus identification information for identifying peripheral base station apparatuses, which is notified from the base station apparatus in advance when the normal communication is transited to the intermittent communication; and
the handover performing unit switches a connection destination to a base station apparatus indicated by the base station apparatus identification information included in the request in accordance with an instruction issued from the base station apparatus.

7. A method for transiting a state where a transmission and a reception between a base station apparatus and a mobile station are made at a predetermined intermittent period, wherein:
the base station apparatus executes a signal reception process also at timing other than predetermined periodical transmission timing of the mobile station apparatus;
the base station apparatus allows a second signal to the mobile station apparatus to be transmitted at a period other than a predetermined period if a first signal is received from the mobile station apparatus at timing other than the transmission timing with the reception process; and
the mobile station apparatus receives the second signal by executing a signal reception process also at timing other than predetermined periodical reception timing if transmitting the first signal at timing other than the transmission timing, wherein
the first signal is a state transition request signal or a handover request signal, and the second signal is a response signal to the first signal, and wherein
the first signal is generated as information of a physical layer and transmitted by the transmitting unit if a period of making the intermittent communication is larger than a threshold value, or the first signal is generated as information of a network layer and transmitted at transmission timing of the intermittent communication if the period is equal to or smaller than the threshold value.

8. A method for an intermittent communication system where an intermittent communication can be made between a base station apparatus and a mobile station apparatus, comprising:

the mobile station apparatus's transmitting information based on a result of measuring a reception signal received in the intermittent communication by using a random access channel.

9. The method for an intermittent communication system according to claim 8, further comprising:

transmitting the information based on a measuring result by using the random access channel after a reception timing in the intermittent communication without waiting for a transmission timing in a next intermittent communication.

10. The method for an intermittent communication system according to claim 8, further comprising:

transmitting the information based on a measuring result by using the random access channel after a reception timing in the intermittent communication and in a first timing before a transmission timing in a next intermittent communication.

* * * * *